United States Patent Office 3,067,488
Patented Dec. 11, 1962

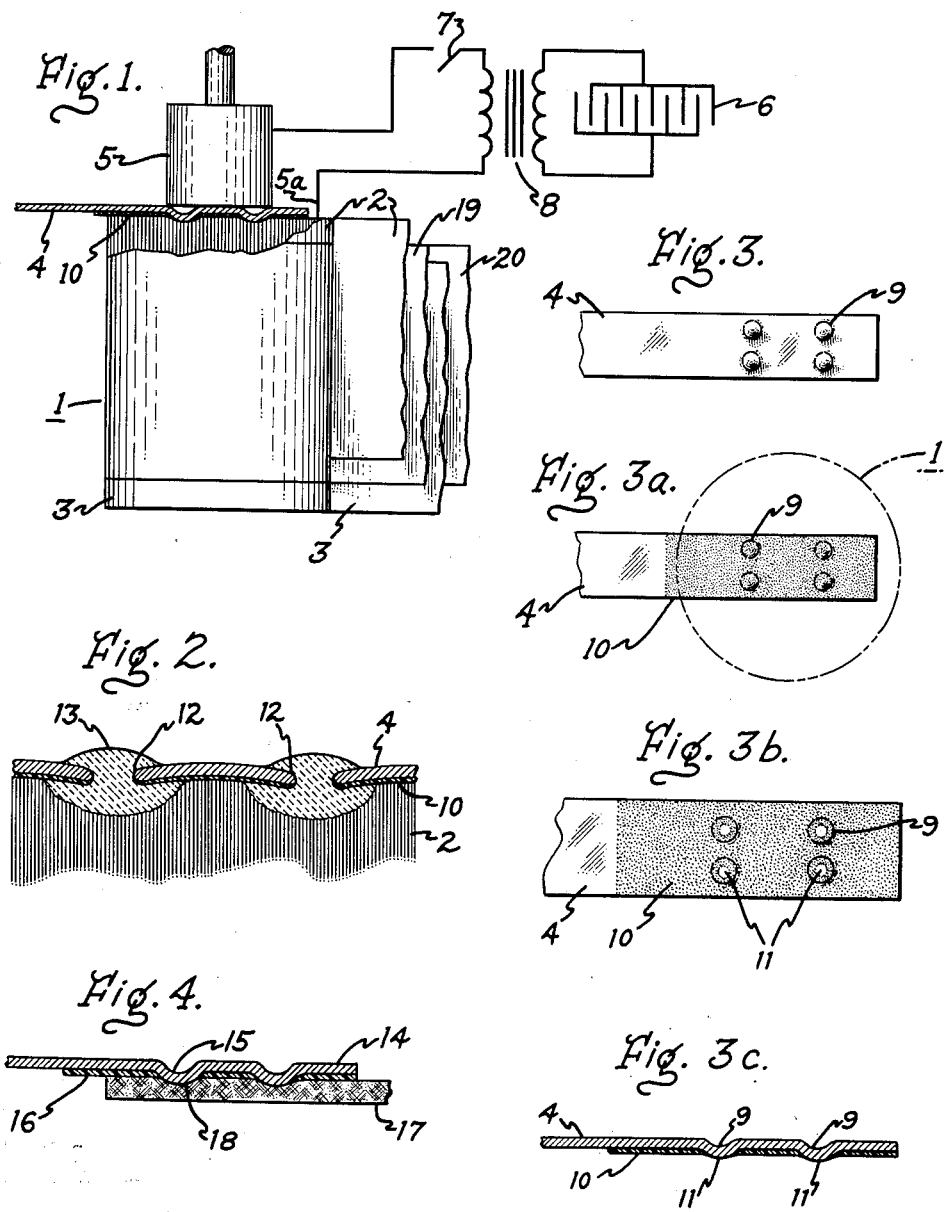

3,067,488
WELDED STRUCTURE AND WELDING PROCESS
FOR MAKING THE SAME
Moreland P. Bennett, Pittsfield, and Clarence W. Levesque, North Adams, Mass., assignors to General Electric Company, a corporation of New York
Filed Feb. 24, 1958, Ser. No. 717,011
4 Claims. (Cl. 29—155.5)

The present invention relates to electrical welding processes, and more particularly to a welding process for making improved terminal connections in electrical devices and to the joint structure produced thereby.

The invention is particularly applicable to capacitors of the so-called exposed foil type which are formed of metallic foil electrodes convolutely interwound with dielectric sheets in roll form so that the electrode foils of opposite polarity project beyond the dielectric sheets at opposite ends of the roll. The secure attachment of terminal leads to capacitors of this type has not been readily achieved heretofore by known procedures. Welding and soldering methods which have previously been employed for this purpose have not provided entirely satisfactory terminal connections or have otherwise proved unsuitable. The yielding and relatively soft surface formed by the exposed edges of the foil roll does not present a sufficiently firm base for the pressures required by the usual welding procedures to make strong welds. Soldering, on the other hand, has not been uniformly effective due to the difficulties arising from the oxide coating on the aluminum or other electrode metals which hinders intimate solder adhesion, and due to the thin edges of the foil which do not provide a sufficiently continuous flat base for effective adhesion of the solder material.

It is an object of the invention to provide an improved process of joining metal parts together which avoids the disadvantages mentioned above.

It is another object of the invention to provide an improved welding process for joining metal members together with a firm, strong joint, wherein one of the metal parts has a relatively soft, yieldable surface.

It is a specific object of the invention to provide an improved method of welding terminal leads to exposed foil type capacitors.

It is still another object of the invention to provide a strong, welded joint structure of the above type.

With the above objects in view, the invention relates to a method of joining one metal part to another having a relatively soft, yieldable surface, which comprises providing a projecting portion on the surface of the one metal part in a region thereof to be placed in contact with the other metal part, the surface of the one metal part in the contact region having an insulating coating thereon except at the projecting portion, placing the one metal part on the other with the projecting portion substantially embedded in the yieldable surface of the latter metal part, and applying a welding current to the thus contacting metal parts. As a result of this arrangement, the welding current passes through the insulation coated metal part to the other part only at the non-insulated projecting portion, causing the projection to rupture and forming a molten metallic mass in the vicinity of the aperture which passes through the ruptured projection and forms a solid, firm weld joint between the two metal parts.

The invention will be better understood from the following description taken in conjunction with the drawing, in which:

FIG. 1 is a view partly in section of a rolled exposed foil capacitor and a welding circuit arrangement, shown diagrammatically, associated therewith which may be employed in securing a terminal lead to the capacitor in accordance with the invention;

FIG. 2 is an enlarged detailed view of the weld joint produced in the FIG. 1 capacitor by the process of the invention;

FIGS. 3, 3a, 3b, and 3c show different stages in the preparation of the terminal member for use in the present process; and FIG. 4 illustrates the application of the invention to a woven type of electrical conductor.

Referring now to the drawing and particularly to FIG. 1 there is illustrated the application of the present invention to an exposed foil capacitor, wherein the present process is especially advantageous for attaching terminal leads to the exposed foil electrodes. The roll type capacitor 1 comprises convolutely wound foil electrodes 2 and 3 of any suitable metal, such as aluminum, exposed at opposite ends of the capacitor roll, the foils being interleaved with dielectric sheets 19 and 20, such as kraft paper, in accordance with the usual practice. A conductive terminal strap 4, having the construction shown in detail in FIGS. 3–3c, is placed on the exposed foil edge at one end of the capacitor roll and a welding electrode 5 is arranged in contact therewith for applying a welding current to the strap 4 and foil 2. The electrical welding circuit for this purpose may include a discharge capacitor 6, welding transformer 8, switch 7 and electrode 5a in contact with the exposed foil 2. Capacitor 6 may be charged by any suitable means prior to the welding operation. To initiate the welding operation, switch 7 is closed to complete the circuit and transmit the welding current from capacitor 6 via welding transformer 8 to welding electrodes 5 and 5a.

In accordance with the invention, terminal strap 4, which may be of any suitable conducting material, such as copper, aluminum, nickel, steel, tin and the like, is provided with a desired number of indents in the area where the weld is to be made. FIG. 3 is a view of the bottom of strap 4 in which projections 9 have been formed. The projections may be produced by any suitable means, such as by pressing with a hand tool or by means of a mechanical pressing machine having suitably formed punches which bear against the upper surface of the strap. After the projections 9 are formed, the bottom surface of strap 4 is covered with an insulating coating 10 extending over the projection area and the entire region adjacent thereto which will come into contact with the metal part to which the strap 4 is to be joined, i.e., the exposed foil end of the capacitor, as illustrated in FIG. 3a. The insulating coating may be composed of any of a variety of materials, such as organic or inorganic insulation material, synthetic resins, which may be applied in liquid form and hardened in situ, or the insulation may be in the form of discrete films or sheets which are suitably bonded by adhesive material to the strap surface.

The insulation coating is then removed from the tips 11 of the projecting portions 9 by any suitable means, such as by an abrading tool or sandpaper, so as to leave a free conducting path at those points through the terminal strap 4, as shown in FIGS. 3b and 3c. The abrading means or procedure used are preferably such that areas of substantially uniform size are left free of insulation, so that uniform weld joints can be achieved at all projection areas.

The strap 4 in the condition shown in FIGS. 3b, 3c is then placed in position as illustrated in FIG. 1 with the insulated portion 10 lying against the capacitor foil end, and the welding current applied by means of the electrodes 5 and 5a which are placed in the position shown.

Upon application of the welding current to the assembly, the electrical energy is concentrated with high current density in the non-insulated projecting portions 11 in passing to the exposed foil mass 2 in which the projections 9 are embedded. The non-insulated areas 11 melt and rupture under the extreme temperature thus developed, with the result that a mass of molten foil material, which is also produced in the vicinity of the ruptured projections due to the highly concentrated welding current, erupts through the aperture formed in the projections and flows around the aperture edges on the upper side of the strap before solidifying against its surface.

FIG. 2 shows the resulting weld joint produced by the described process. As shown therein, the welded structure comprises terminal strap 4 having a bottom insulating layer 10, and apertures 12 through which solidified metal masses 13 extend forming strong, tightly adherent weld joints between the foil edges 2 and terminal strap 4.

The following is a specific procedure which illustrates the manner in which the invention may be carried out for welding tap straps to capacitors, it being understood that the example set forth is not intended to limit the scope of the invention:

Aluminum, stainless steel and tinned copper tap straps about 2 to 3 inches wide were welded to the exposed foil ends of wound aluminum electrode capacitors using resistance welding equipment consisting of a low-inertia welding head, welding transformer and a capacitor discharge power supply having a heat capacity of 250 watt-seconds.

The straps were prepared by forming two $.070'' \times .020''$ round projections on each strap equi-distant from the longitudinal edges of the strap and applying a liquid resin composed of polyvinyl butyral and phenolic resin on the surface portion of the strap having the projections to provide an electrical insulating coating thereon. The applied insulating material was allowed to dry, and the insulation was removed from the tips of the projections by a file. The projections were then placed in contact with the capacitor foil edges and the straps were welded to the respective capacitors, the following table indicating the welding procedure for each type of strap:

| Tap Strap Material | Strap Thickness, in. | Weld Time, sec. | Electrode Pressure, lbs. | Heat Setting, watt-sec. |
| --- | --- | --- | --- | --- |
| Aluminum | .010 | .002–.006 | 12 | 200 |
| Stainless Steel | .002–.010 | .002–.006 | 14 | 100 |
| Tinned Copper | .002–.010 | .002–.006 | 12 | 250 |

While an electrode pressure of about 12–14 lbs. was used in the above procedures, lower pressures could be used with satisfactory results.

Although the described welding procedure has been found particularly satisfactory in making terminal connections to exposed foil capacitors, the invention is not limited in its application to such operations. The invention is applicable in general to the making of strong welded joints between two metal bodies, one of which is relatively yielding, soft and porous and does not present a sufficiently rigid surface to make the conventional welding processes fully effective.

FIG. 4 shows another embodiment of the present invention wherein a conductive member 14 having projections 15 and insulating coating 16 is applied to a conductor 17 composed of braided or woven metal strands, as in well known constructions of this type. Here, too, projections 15 having non-insulated tips 18 become embedded to a certain extent in the yieldable material of conductor 17, and in a manner similar to that described above there occurs during the welding operation an eruption of the molten metal of conductor 17 through the ruptured projections 15 to form a strong weld joint between the two metal parts.

The number, arrangement and shape of the projections may vary as desired, depending among other things on the size and shape of the metal parts to be joined. Thus, the projecting portions may be elongated rather than circular as shown in the illustrated embodiment. The metal parts to be joined likewise can be of a wide variety of shapes and thicknesses. For example, instead of a flat strap 4, the terminal member in the embodiment shown may comprise a metal disc overlying the exposed foil end and having a lead wire or the like suitably attached thereto, the disc being indented and projections insulated in a manner similar to the strap 4 in the illustrated arrangement.

In its broad aspects, the invention includes within its scope the provision of non-insulated projections or embossed areas on a metal part to be welded, without corresponding indentations on the opposite side of the metal part as shown in the illustrated embodiments. It is essential only that the embossed surface which is to be placed in contact with the other metal part be coated with a material which electrically insulates the two the metal parts from each other except at the projecting portions of the embossed part. It is of course necessary that the embossed non-insulated portions, as in the case of the indented non-insulated portions of the illustrated embodiment, be sufficiently thin or that a sufficient amount of welding current be employed to melt and rupture the metal part at its projections during the welding operation.

Although the welding process described is of particular advantage for welding a metal part to another metallic body which is relatively soft and yielding and in which the projections of the indented part are readily embedded, the invention may also find use where both metal parts are relatively rigid and hard. The concentration of welding current at the non-insulated points may in such cases also be effective to produce strong welded joints more readily and conveniently than is accomplished by the prior welding procedures. This is particularly true where there would be contacting surfaces other than at the projections.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What we claim as new and desire to secure by Letters Patent of the United States is:

1. The method of joining a metal part to a metal body having a relatively soft porous surface which comprises providing at least one projecting portion on said metal part in the area thereof adapted to come into contact with said metal body, said metal body being substantially thicker than said projecting portion, placing said metal part and metal body in superposed assembly with a layer of insulating material therebetween electrically insulating the same from one another except in the area of said projecting portion and with the projecting portion substantially embedded in said metal body, and applying a sufficient amount of welding current to the thus assembled metal part and metal body to melt and rupture said metal part at said non-insulated projecting portion, whereby the welding current passes through said metal part to said metal body only at said non-insulated area and forms an aperture in said non-insulated projecting portion through which erupts molten metal of said metal body resulting from the passage of the welding current.

2. The method of joining a metal part to a metal body having a relatively soft porous surface which comprises indenting said metal part for providing at least one projecting portion thereon, said metal body being substantially thicker than said projecting portion, placing said metal part and metal body in superposed assembly with a layer of insulating material therebetween electrically insulting the same from one another except for the area of said projecting portion and with said non-insulated projecting portion embedded in said metal body, and applying a sufficient amount of welding current to the thus assembled metal part and metal body to melt and rupture said metal part at said non-insulated projecting portion whereby the welding current passes between said metal part and metal body only at said non-insulated projecting portion and forms an aperture therein through which erupts molten metal of said metal body resulting from the passage of the welding current.

3. The method of joining a metal part to a metal body having a relatively soft porous surface which comprises providing indentations in said metal part for forming projections thereon, said metal body being substantially thicker than said projections, the area of said metal part adapted to come into contact with said metal body having an electrically insulating coating thereon except on said projecting portions, arranging said metal part on said metal body with said insulated area in contact therewith and said non-insulated projecting portions embedded therein, and applying a sufficient amount of welding current to the thus contacting metal part and metal body to melt and rupture said metal part at said projecting portions thereof, whereby welding current passes through said metal part to the metal body only at said non-insulated projecting portions and forms apertures in said projecting portions through which erupts molten metal of said metal body resulting from the passage of the welding current.

4. The method of securing a terminal strap to an electrical capacitor having exposed convolutely wound electrode foil edges at its end comprising providing indentations in the terminal strap for forming projecting portions therein in the area thereof adapted to come into contact with the exposed foil edges of the capacitor, the depth of the exposed foil edges of the capacitor being greater than the thickness of said projecting portions, providing an electrically insulating coating on said area of said terminal strap, removing the insulating coating on said projecting portions of said terminal strap, arranging said terminal strap on the exposed foil edges of the capacitor with said insulated area in contact therewith and the non-insulated projecting portions substantially embedded therein, and applying a sufficient amount of welding current to the contacting terminal strap and foil edges to melt and rupture said terminal strap at said projecting portions thereof, whereby the welding current passes through the terminal strap to the foil edges only at said non-insulated projecting portions and forms apertures in said projecting portions through which erupts molten metal of said foil edges resulting from the passage of the welding current.

References Cited in the file of this patent

UNITED STATES PATENTS

| | | |
|---|---|---|
| 846,480 | Lachman | Mar. 12, 1907 |
| 965,992 | Dean | Aug. 2, 1910 |
| 1,229,700 | Auel | June 12, 1917 |
| 1,670,700 | Weed | May 22, 1928 |
| 1,744,797 | Pfeiffer | Jan. 28, 1930 |
| 1,871,491 | Brandt | Aug. 16, 1932 |
| 2,006,458 | Jones et al. | July 2, 1935 |
| 2,250,156 | Ferguson | July 22, 1941 |
| 2,416,379 | Cohn | Feb. 25, 1947 |
| 2,441,176 | Wilson et al. | May 11, 1948 |
| 2,452,805 | Sussenbach | Nov. 2, 1948 |
| 2,526,688 | Robinson et al. | Oct. 24, 1950 |
| 2,679,305 | Gunthorp | May 25, 1954 |